March 6, 1956 — R. A. BONINI — 2,737,340
SPRAYING ATTACHMENT FOR LAWN MOWER
Filed Dec. 1, 1952
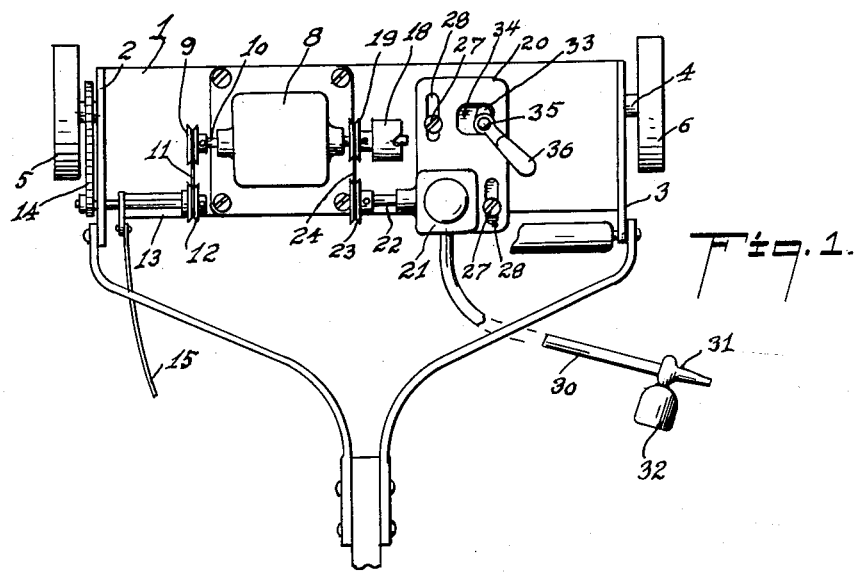
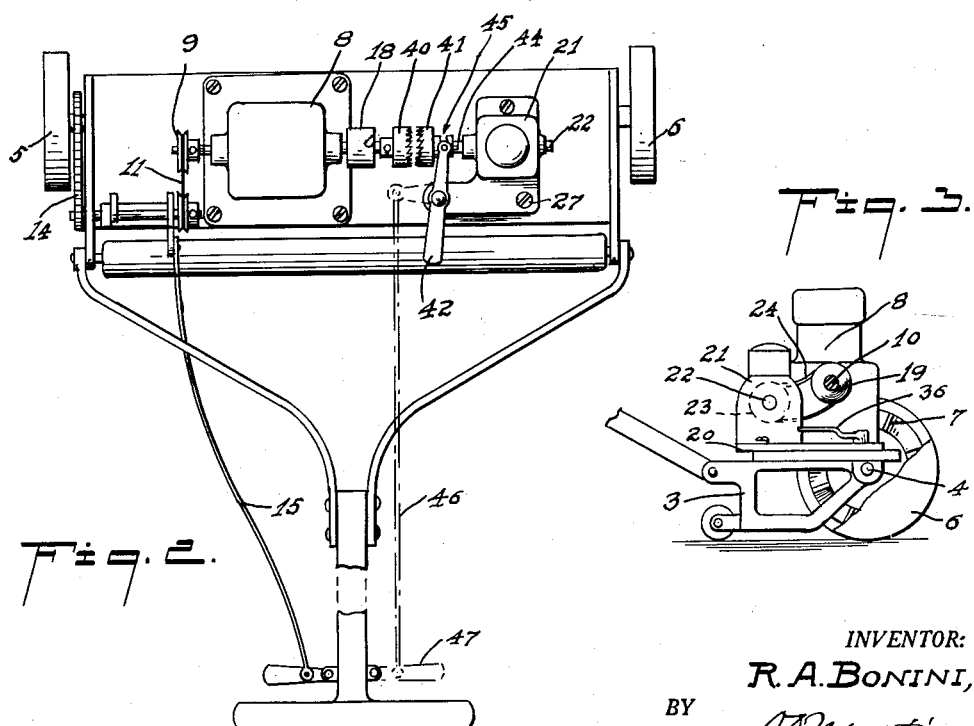
INVENTOR:
R. A. BONINI,
BY
ATTORNEY.

United States Patent Office 2,737,340
Patented Mar. 6, 1956

2,737,340

SPRAYING ATTACHMENT FOR LAWN MOWER

Robert A. Bonini, Los Angeles, Calif.

Application December 1, 1952, Serial No. 323,448

3 Claims. (Cl. 230—56)

This invention relates to power lawn mowers and has particular reference to simple means for combining suitable spraying apparatus with such mowers.

It is the general object of the invention to provide on a power lawn mower spraying apparatus which is connected for operation by the mower motor and which may be operated independently of the mower traction wheels and cutting reel.

These and other objects of the invention together with the advantageous features thereof will become apparent upon perusal of the following detailed description and by referring to the accompanying drawing in which preferred forms of the invention are illustrated.

In the drawing:

Fig. 1 is a plan view of a power lawn mower embodying the invention;

Fig. 2 is a substantially corresponding end view of the device with parts thereof broken away for the sake of clearness; and Fig. 3 is a plan view of a somewhat modified form of the invention.

Power lawn mowers generally include a framing consisting of a platform 1 and end brackets 2, 3 rigidly combined therewith in any conventional manner to support the main shaft 4 on which the traction wheels 5, 6 are mounted. The cutting reel is in such machines generally mounted directly on this shaft but as this device has no direct connection with the present invention, it is merely outlined at 7 in Fig. 3 of the drawing. A motor 8 is mounted on the platform and it is connected to rotate the drive shaft 4. Such connection is in some power lawn mowers shown to consist of a pulley 9 on the motor shaft 10 which pulley by a belt 11 is connected with a pulley 12 of a rock frame 13. A chain 14 connects the pulley shaft 10 with the main drive shaft 4.

A conventional starting drum 18 is mounted on the other end of the motor shaft and a pulley 19 is secured to this shaft within the drum. On the platform 1 is placed a base plate 20 on which a spraying apparatus is mounted. This apparatus includes a compressor 21 to the shaft 22 of which a pulley 23 is secured and a normally slack belt 24 connects this pulley with the motor shaft pulley 19. The base plate 20 is mounted on the mower platform for limited sliding movement perpendicular to the motor and sprayer shafts to tighten the belt 24 whenever it is desired to use the spraying apparatus. The means employed to limit the sliding movement of the base plate is, for the sake of simplicity, shown to include a plurality of screws 27 seated in screw threads of the platform and rising through slots 28 of the plate, but more convenient devices may, of course, be substituted. Such means may take the form of a cam 33 seated in a slot 34 of the plate 20 and secured in position on the platform by a stud 35. A handle 36 of the cam is operable to turn the cam counterclockwise to retract the platform and thereby to tighten the belt.

When the base plate 20 is shifted rearwardly to tighten the belt, while the motor is in motion, it is seen that the compressor is operated. A hose 30 extending from the compressor is fitted with a spraying nozzle 31 and a receptacle 32 for weed exterminating material is attached to this nozzle in any commercially well-known manner by air pressure to discharge the material. Since the traction wheel driving belt 10 normally is slack, it is seen that the spraying attachment may be operated while the mower is at rest. But should it be required to do the spraying while the mower is in motion, it is merely required to tighten the belt 10. This type of mower is provided with a pull rod 15 extending to the handle 16 of the machine to enable the user to control the operation of the machine without releasing his hold on the mower handle.

In the modified form of Fig. 2, the motor and motor connections to the traction wheels may remain as above described but the pulley 9 is removed and a clutch member 40 mounted on the end of the motor shaft. The compressor 21 is, in this case, advanced on the platform axially to aline the shafts 9 and 22. The other clutch member 41 is mounted on the end of the compressor shaft and suitable means, such as a lever 42, is mounted on the compressor base plate to operate this clutch member. The latter is for this purpose, shown riding on a spline 44 of the compressor shaft and the inner end of the lever 42 is fitted to ride in an annular groove 45 of the clutch member 41. But, if preferred, the lever 42 may be shaped to form a bellcrank from which an operating rod 46 extends to a hand lever 47 on the mower handle, all as indicated in dotted outline in Fig. 2. Since, in this modified form of the device, the compressor remains stationary, it is merely required to tighten the screws 27.

Because the location of the motor on the platform varies in different makes of power lawn mowers it should be understood that a differentt base plate may be substituted for more convenient mounting on the particular type of lawn mower to be served. Other modifications may be embodied within the scope of the claims hereto appended.

It is also to be understood that the spraying attachment may be used for spraying paint or any other material and that the power lawnmower forms an economical and convenient operating means for such spraying equipment.

I claim:

1. A spraying device attachable to a lawn mower having a platform and a motor on the platform, said device comprising a plate mountable on the platform, a compressor on the plate, a pulley on the motor shaft, a pulley on the compressor shaft, a normally slack belt on the pulleys, the plate having slots therein, and screws engaging screw threads of the platform and rising through said slots, the plate being adjustable on the platform within the limits of the slots to tighten the belt, the screws being operable to clamp the plate in adjusted position.

2. A device as set forth in claim 1 in which cam means is provided for manually adjusting the plate as required for belt tightening and slackening operations.

3. A device as set forth in claim 1 in which a perfora- is cut through the plate, a stud mounted in the platform rises through said perforation, a cam on said stud within the perforation, and a handle on the cam operable to rotate the cam on the stud to effect the adjustment of the plate on the platform.

References Cited in the file of this patent

UNITED STATES PATENTS

| 1,116,390 | Davis | Nov. 10, 1914 |
| 1,333,923 | Jones | Mar. 16, 1920 |
| 1,409,183 | Keagle et al. | Mar. 14, 1922 |
| 2,044,884 | Keller | June 23, 1936 |
| 2,288,596 | Pierce | July 7, 1942 |
| 2,595,098 | Poglay | Apr. 29, 1952 |

OTHER REFERENCES

Popular Science Magazine, page 92, Sept. 1949.